United States Patent [19]

Göhring et al.

[11] Patent Number: 4,783,288

[45] Date of Patent: Nov. 8, 1988

[54] METHOD FOR THE PRODUCTION OF SHAPED SYNTHETIC MEMBERS

[76] Inventors: Karl Göhring, Leonorenstr. 11, 7000 Stuttgart 70; Hermann Kress, Schubertweg 1, 7024 Filderstadt 1, both of Fed. Rep. of Germany

[21] Appl. No.: 34,534

[22] Filed: Apr. 6, 1987

[30] Foreign Application Priority Data

Apr. 8, 1986 [DE] Fed. Rep. of Germany ....... 3611687

[51] Int. Cl.⁴ .................... B29C 43/18; B29C 67/04; B29C 45/00; B29C 43/02
[52] U.S. Cl. ..................................... 264/27; 264/122; 264/123; 264/126; 264/131; 264/176.1
[58] Field of Search ................ 264/27, 122, 126, 40.1, 264/40.2, 105, 123, 125, 126, 131, 176.1; 425/174.6

[56] References Cited

U.S. PATENT DOCUMENTS

| | | | |
|---|---|---|---|
| 2,439,966 | 4/1948 | Dinzl | 425/174.6 |
| 3,254,143 | 5/1966 | Heitman | 264/27 |
| 3,268,633 | 8/1966 | Jansen | 264/27 |
| 3,284,372 | 11/1966 | Bailey | 264/27 |
| 3,733,385 | 5/1973 | Reddish | 264/126 |
| 4,065,519 | 12/1977 | Koch | 264/122 |
| 4,193,956 | 3/1980 | Kalnins | 264/27 |
| 4,491,553 | 1/1985 | Yamada et al. | 264/122 |
| 4,518,552 | 5/1985 | Matsuo et al. | 264/126 |
| 4,518,704 | 5/1985 | Okabashi et al. | 264/122 |

Primary Examiner—Willard Hoag
Attorney, Agent, or Firm—Fred Philpitt

[57] ABSTRACT

The invention relates to a method for the production of shaped synthetic members, in which
(a) Synthetic granulated particles are mixed and coated with a conducting powder;
(b) An electric current is passed through the mixture of granulated particles and conducting powder the surfaces of the granulated particles becoming plasticized;
(c) The mixture of granulated particles and conducting powder is sintered to form a preform under the action of pressure;
(d) The preform is extruded into a moulding cavity thus forming the shaped synthetic member.

12 Claims, 1 Drawing Sheet

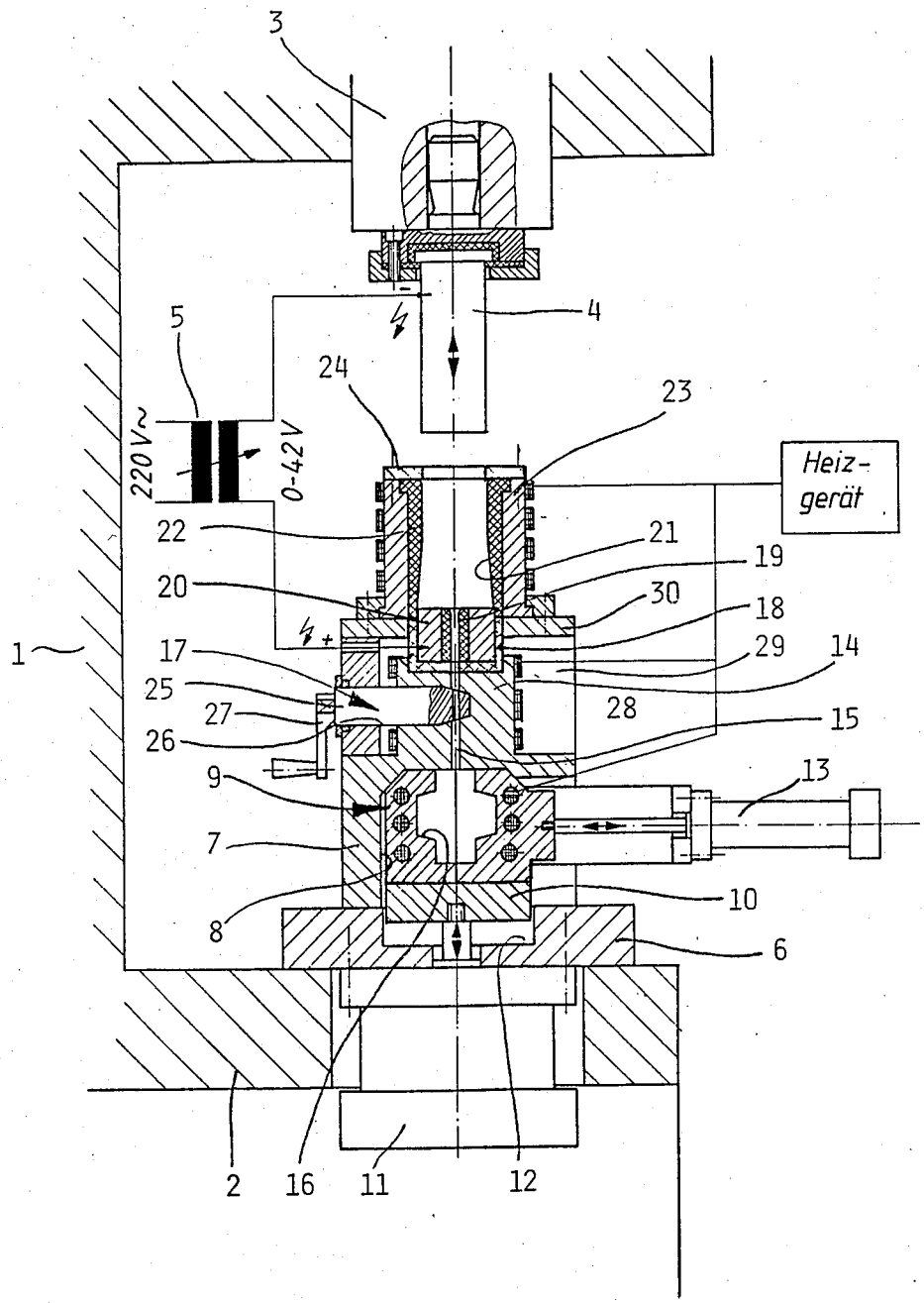

METHOD FOR THE PRODUCTION OF SHAPED SYNTHETIC MEMBERS

BACKGROUND

The production of shaped synthetic members from synthetic granulated particles, which was superficially plasticised, then compressed under pressure to form a preform, which is then extruded in turn into a moulding cavity, has become known by the name "impact sintering". This method is therefore advantageous because one the one hand the consumption of energy is relatively low (in this method the mass of synthetic material remains unsintered) and on the other hand because thick-walled shaped synthetic members can be produced without shrinkage, which cannot be produced with normal casting processes.

The superficial plasticisation of the synthetic granulated particles, which is a pre-requisite in "impact sintering", can be brought about in various ways. Thus the synthetic granulated particles can be softened superficially by a solvent; as an alternative, a selective heating of the (blackened) surfaces of the granulated particles by microwaves in a resonator is considered. A further known possibility for the surface plasticisation, with which the present invention deals, consists of producing a mixture of the synthetic granulated particles and a conducting powder and then of passing an electric current through this mixture. This current flows through the conducting powder, which clings to the surface of the granulated particles and sinters the surface of the granulated particles in the desired manner in the case of corresponding control of the method.

In the known method, pure conducting powder in the form of graphite particles ("conducting carbon black") is added to the synthetic granulated material. In this case there is a great danger that the pure graphite particles may become heated excessively in the flow of current so that the synthetic material decomposes and no sintering occurs. The conducting powder forms a cohesive layer between the individual granulated particles and thus prevents their intimate bonding.

THE INVENTION

It is the object of the present invention to provide a method of the afore-mentioned type so that reliable, intimate bonding of the granulated particles takes place during the sintering process.

This object is achieved according to the invention due to the fact that a synthetic powder is added to the conducting powder.

The synthetic powder added to the conducting powder according to the invention is first of all heated by the flow of current until its melting temperature is exceeded. When the powder melts, the conducting particles are embedded by the molten material and thus insulated. In this way, the synthetic material can no longer be destroyed by overheating. The conducting particles are no longer located as a cohesive layer between the individual granulated particles, but are present in a fine-grained conglomerate, embedded in the molten material.

Generally it is appropriate if the synthetic powder consists of the same material of which the granulated particles also consist. In this case, certainly no difficulties occur with the chemical compatability and/or thermal stresses.

It is appropriate if first of all the conducting powder and the synthetic powder are mixed together and if only after this is this mixture mixed with the granulated particles. It is thus largely prevented that preferred current paths through the growing preform are produced. It has proved successful if approximately 10 to 40% by weight of the conducting powder is mixed with approximately 60 to 90% by weight of the synthetic powder.

The best results hitherto were obtained if approximately 20% by weight of the conducting powder is mixed with approximately 80% by weight of the synthetic powder.

It is further recommended to mix approximately 3 to 40% by weight of the mixture of conducting powder and synthetic powder with approximately 60 to 97% by weight of the granulated particles.

Once again, the best results hitherto were achieved when approximately 20% by weight of the mixture of conducting powder and synthetic powder was mixed with approximately 80% by weight of the granulated particles.

The conclusion of sintering can be ascertained particularly simply due to the fact that during sintering the current flowing through the preform in the course of formation is measured and sintering is terminated when the current has dropped to a certain value. According to the above ideas, the drop in current is presumably attributed to the fact that the individual conducting particles of the conducting powder are embedded in the sintering synthetic powder and in the sintering surface material of the synthetic granulated particles.

The conducting powder is appropriately a graphite powder ("conducting carbon black"); the synthetic material is appropriately an ultra high molecular polyethylene.

According to a particular embodiment of the invention, on the way between the preliminary chamber and the moulding cavity, the material of the preform is extruded through at least one narrow nozzle, the dimensions of the effective nozzle cross section being smaller than the dimensions of the individual granulated particles so that on passing through the nozzle the granulated particles are deformed and the moulding cavity is filled successively by at least one thin strand, which consists of superficially plasticised, mechanically deformed granulated particles.

Due to the mechanical deformation brought about according to the invention in the narrow nozzle of the granulated particles which are largely solid as regards their substance, a further improvement of the mechanical properties of the ultimately produced shaped synthetic member is achieved.

This method is particularly facilitated by the addition according to the invention of synthetic powder to the conducting powder, since then the formation of the final shaped member from the thin strand or strands in the moulding cavity is facilitated.

If one proceeds in the manner described then it is recommended that the nozzle(s) remains (remain) closed until the completion of the preform. It is thus possible to form the preform under an exactly precise pressure, without material already being extruded by way of the narrow nozzle into the moulding cavity.

One embodiment of the invention is described in detail hereafter with reference to the drawings;

the single FIGURE is a diagrammatic vertical section through an apparatus for producing shaped members from synthetic granulated material.

The apparatus illustrated uses a conventional press, whereof the frame 1, press table 2 and working ram 3 are shown only diagrammatically and partially. Attached to the working ram 3 in an electrically insulated manner is a metal press plunger 4, which is connected to one pole of an adjustable direct-current supply 5.

Screwed to the press table 2 is a support 6, which in turn supports a retaining block 7 standing between two side cheeks 29. Located in a recess 8 in the retaining block 7, which recess is open towards the side and on the underside, is a two-part heated mould 9, which is pressed positively against the upper side of the recess 8 by an auxiliary ram 10. Due to this the mould 9 is simultaneously locked in the closed position. The auxiliary ram 10 is actuated by way of a servo-motor 11 and for opening the mould can be lowered together with the mould 9 in a downwards direction into a position in which it comes to bear against a recess 12 in the support 6. In this position, the right-hand half of the mould 9 in the drawing can be moved away by means of a further servomotor 13.

A vertical channel 15, which opens into the moulding cavity 16, passes through a neck-shaped region 14 of the retaining block 7 which is located above the mould 9 and is heated. Located in the course of the channel 15 is an adjustable nozzle, which is provided generally with the reference numeral 17 and whereof the exact construction and operation will be described hereafter. The channel 15 passes through a cup-like insulation layer 18 located above the neck-shaped region 14 of the retaining block 7 and within a hardened bush 19 through a further electrode 20, which is connected to the second pole of the adjustable direct-current supply 5.

The electrode 20 forms the base of a preliminary chamber 21, which is defined radially by a hardened insert 22. This is inserted in a heated part 23, which is screwed to a cross plate 30 connecting the cheeks 29 at the top. An annular plate 24 attached to the heated part 23 fixes the insert 22 in the axial direction.

The adjustable nozzle comprises a mandrel 25, which tapers conically at its inner end. The mandrel 25 may be rotated by means of a crank handle 26 in a complementary mounting bore 27 in the retaining block 7. Passing through the tapering, inner region of the mandrel 25 is a throughhole 28, whereof the axis extends at right angles to the axis of rotation of the mandrel 25.

The arrangement is such that by rotating the mandrel 25, the through hole 28 can be brought into greater or lesser alignment with the channel 15. A variable overlapping area is produced in this way between the channel 15 and the through hole 28, which area represents the narrowest cross section in the path between the preliminary chamber 21 and the moulding cavity 16. This narrowest cross section is in this case referred to as "effective nozzle cross section".

The method of operation of the above-described apparatus will become clear hereafter, when the production of a concrete example of a shaped synthetic member is described in detail.

First of all, a basic mixture is produced from 80% by weight of a powder, which consists of ultra high molecular polyethylene and of 20 g graphite powder (an electrically conducting powder, which is also known as "conducting carbon black"). 20 g of this mixture are again mixed intensively with 80 g granulated particles, the material of the granulated particles being consistent with the material of the above-mentioned ultra high molecular polyethylene powder.

A corresponding quantity of the last-mentioned mixture, which is thus composed of granulated particles and powder mixture, is supplied to the preliminary chamber 21 of the afore-described apparatus. The nozzle 17 or its mandrel 25 is first of all rotated so that the through hole 25 lies transversely, thus no effective nozzle cross section is available for the passage of material between the preliminary chamber 21 and the moulding cavity 16. In the apparatus used, the diameter of the preliminary chamber amounted to approximately 45 mm; the length of the preform amounts to approximately 70 mm.

Now the press plunger 4 is introduced into the preliminary chamber 21, until a pressure of approximately 20 kp/mm$^2$ is reached. In this case, the mixture containing granules and located in the preliminary chamber 21 is compressed. Then the direct-current supply 5 is activated. The voltage is adjusted so that with the afore-mentioned dimensions of the preliminary chamber, a current of approximately 6 A flows. In the apparatus used, the associated voltage amounts to approximately 24 volts. The surfaces of the individual granulated particles are softened due to resistance heating; at the same time the synthetic material powder sinters, which, as above-mentioned, has been mixed with the conducting graphite powder. Due to this, the actual sintering of the contents of the preliminary chamber 21 to form a preform takes place.

The conclusion of the sintering process can be ascertained by a drop in the current flowing through the preform. The reasons for this drop in current are not yet completely clear; probably it is based on a "thinning" of the conducting graphite powder due to the fact that synthetic material in which the graphite powder is increasingly embedded, sinters.

Now the pressure acting on the preform in the preliminary chamber 21 is increased to approximately 60 kp/mm$^2$. The mandrel 25 of the nozzle 17 is brought into a rotary position which was pre-determined previously in accordance with the grain size of the granular material, which was approximately 3 mm, so that the granulated particles can only pass this point with mechanical deformation. Under the continuing pressure of the press plunger 4, the earlier preform now enters the moulding cavity 16 as a thin strand, which consists of mechanically deformed, but solid granular particles with a soft surface. This strand fills the moulding cavity 16, in which case the surface of various regions of the strand lie one against the other and join one to another. Under the influence of the pressure of the press plunger 4 acting through the channel 15 and the nozzle 17, a cohesive, inclusion-free shaped member is thus formed in the moulding cavity 16, whereof the mechanical strength considerably exceeds that of the initial synthetic material.

After the formation of the shaped synthetic member in this way is terminated, the mould 9 is immediately lowered into the mould release position by means of the auxiliary ram 10. After moving away the half of the mould 9 located on the right-hand side in the drawing, the mould 9 can be emptied without delay, without the shaped member suffering any thermal damage. In the afore-described method of manufacture, the synthetic material is brought to a homogeneous temperature so that no internal stresses occur within the shaped member.

Abridgement

Shaped synthetic members are produced due to the fact that first of all synthetic granulated particles are plasticised superficially by resistance heating and from this a preform is formed under pressure. The preform is then extruded under further pressure into a moulding cavity. In the case of resistance heating, the current flows by way of a mixture mixed with the synthetic granulated particles, which are in turn composed of a conducting powder, in particular of graphite and of a synthetic powder. Overheating of the synthetic material and the formation of a continuous graphite layer located between the individual granular particles is thus prevented, as occur when using a powder component, which consists exclusively of conducting powder.

We claim:

1. A method for the production of a shaped synthetic member which comprises
   (a) coating synthetic granulated particles with a mixture of a conducting powder and a synthetic powder,
   (b) passing an electric current through the coating of said coated granulated particles in a first zone whereby the surfaces of the granulated particles are plastified.
   (c) sintering the coated granulated particles to a preform in said first zone under the action of pressure; and
   (d) extruding the preform from said first zone into a moulding cavity to thus form a shaped synthetic member.

2. The method according to claim 1 wherein said synthetic powder consists of the same material as the synthetic granulated particles.

3. The method according to claim 1 wherein the conducting powder and the synthetic powder are first mixed with each other and thereafter this mixture is mixed with the synthetic granulated particles.

4. The method according to claim 1 wherein approximately 10 to 40% by weight of the conducting powder is mixed with approximately 60 to 90% by weight of the synthetic powder.

5. The method according to claim 4 wherein approximately 20% by weight of the conducting powder is mixed with approximately 80% by weight of the synthetic powder.

6. The method according to claim 3 wherein approximately 3 to 40% by weight of the mixture of conducting powder and synthetic powder is mixed with approximately 60 to 97% by weight of the synthetic granulated particles.

7. The method according to claim 6 wherein approximately 20% by weight of the mixture of conducting powder and synthetic powder is mixed with approximately 80% by weight of the synthetic granulated particles.

8. The method according to claim 1 wherein during sintering the current flowing through the preform in the course of formation is measured and sintering is terminated when the current has dropped to a certain value.

9. The method according to claim 1 wherein the conducting powder is a graphite powder.

10. The method according to claim 1 wherein the synthetic material is an ultra high molecular polyethylene.

11. The method according to claim 1 wherein in passing from said first zone to said moulding cavity the material of the preform is extruded through a narrow passageway that has a cross section dimension less than the dimensions of the individual granulated particles so that in passing through said narrow passageway the synthetic granulated particles are deformed mechanically and the moulding cavity is gradually filled by material that consists of superficially plasticized, mechanically deformed synthetic granulated particles, sintered synthetic powder and conducting powder.

12. A method according to claim 11 wherein said narrow passageway remains closed until the preform is completed.

* * * * *